Sept. 21, 1926.
J. PEDERSON
1,600,735
SLED WITH TURNING RUNNERS
Filed June 15, 1925
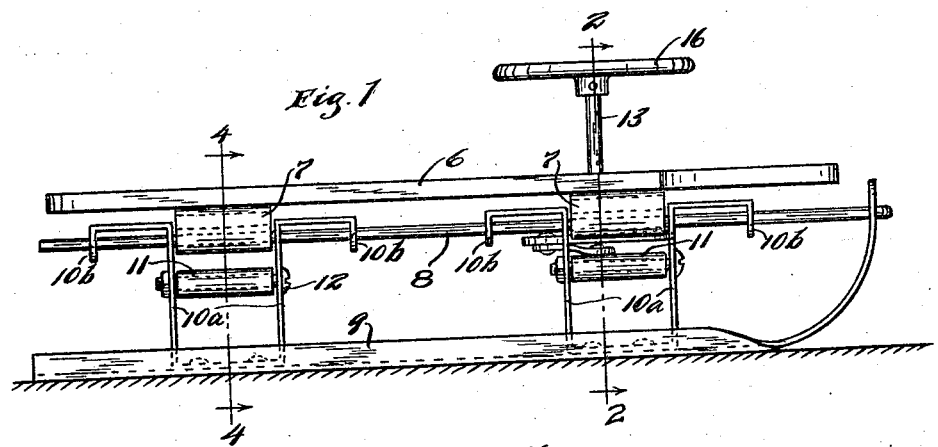
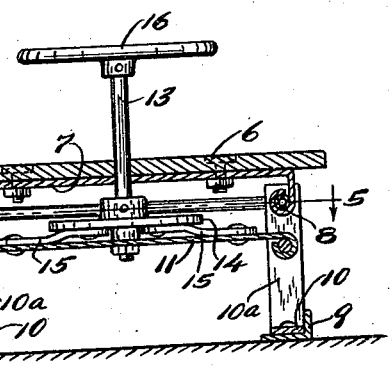
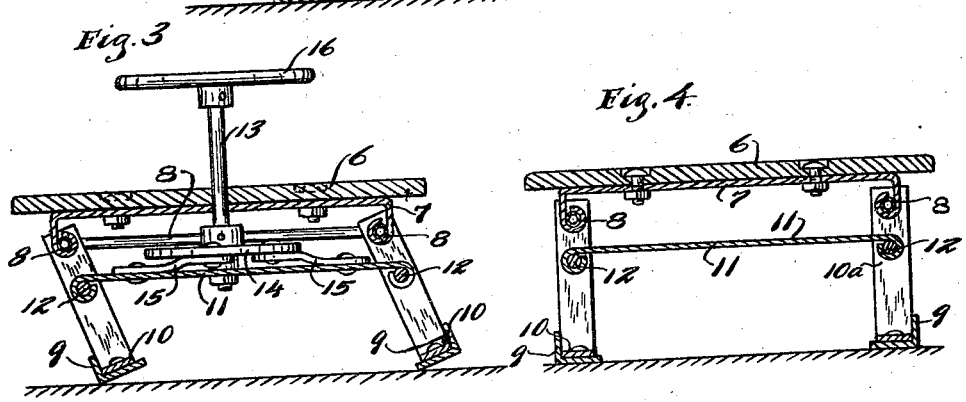
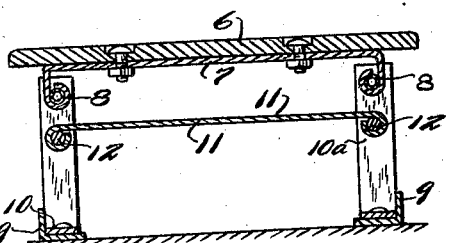
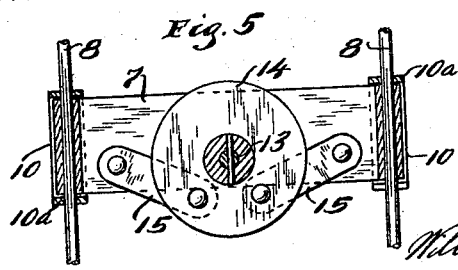
INVENTOR.
JOHN PEDERSON.
BY HIS ATTORNEYS Patented Sept. 21, 1926.

1,600,735

UNITED STATES PATENT OFFICE.

JOHN PEDERSON, OF ZUMBROTA, MINNESOTA, ASSIGNOR OF ONE-HALF TO OLAF J. PEDERSON, OF ZUMBROTA, MINNESOTA.

SLED WITH TURNING RUNNERS.

Application filed June 15, 1925. Serial No. 37,261.

This invention relates to a vehicle, particularly a vehicle in the form of a sled having runners adapted to move about axes extending longitudinally of the sled. As is well known, it is often desirable to make turns with the sled while the same is in motion. Difficulty is often experienced in making turns and sleds or sleighs often overturn at such times.

It is an object of the invention to provide a sled or sleigh having runners with comparatively sharp bottom runners, which runners are adapted to be moved about longitudinal axes to cause said runners or the corners thereof to be inclined to the supporting surface so that a much greater resistance will be offered to the runners and the skidding movement of the sled will be prevented and the turning thereof facilitated.

It is a further object of the invention to provide a sled or sleigh having spaced runners, together with means for simultaneously turning said runners about axes extending longitudinally of the sled.

These and other objects and advantages of the invention will be fully set forth in the following description made in connection with the accompanying drawings in which like reference characters refer to the same parts throughout the different views, and in which, Fig. 1 is a view in side elevation of the sled embodying the invention;

Fig. 2 is a vertical section taken on the line 2—2 of Fig. 1, as indicated by the arrows;

Fig. 3 is a view in vertical section similar to Fig. 2, showing the parts in a different position;

Fig. 4 is a vertical section taken on the line 4—4 of Fig. 1, as indicated by the arrows; and Fig. 5 is a horizontal section taken on the line 5—5 of Fig. 2.

Referring to the drawings, a sled is shown comprising a frame or body having a seat board 6. Secured to the board 6 are spaced transversely extending bars 7 having downturned ends forming bearings and supports for the parallel sides of a rod 8 extending longitudinally of the board 6 beneath the same and across the front end thereof. While the rod 8 may be made in various forms, the same is illustrated as formed of ordinary piping. The rod 8 is firmly and rigidly held in the bars 7. Spaced runners 9 are provided, and while these runners may be made in various forms, in the embodiment of the invention illustrated, the same are shown as in the form of angle bars having sides extending substantially at right angles with comparatively sharp corners which are disposed outwardly of said sled. The runners 9 have bars 10 secured thereto, the ends of which extend upwardly, as indicated at $10^a$, having apertures adjacent their upper ends through which pass the rods 8. The portions $10^a$ of bars 10 are disposed at each side of the bars 7 and said portions $10^a$ then extend away from the bars 7 and have their ends turned downwardly to form ears $10^b$ which are also apertured to receive the parallel sides of rod 8. The runners 9 are thus pivotally connected to the rod 8 and are supported thereon at widely spaced points so that the runners are effectively supported against any movement at an angle to their longitudinal axes. The members $10^a$, at each side of the sled, or in other words, the members $10^a$ which are oppositely disposed on the respective runners 9, are connected by transverse bars 11 having ears or lugs at each end pivotally embracing headed and nutted bolts 12 extending between and connecting the members $10^a$ of each of the bars 10. The stem shown as a cylindrical rod 13, extends centrally through the board 6 and is journaled therein adjacent one end of said board above the forward bar 11 and said stem has secured to its lower end a disk 14. The disk 14 has links 15 pivotally secured at each side of the longitudinal axis of the board 6, which links extend outwardly and are also pivotally secured to the forward bar 11. The stem 13 has an operating hand wheel 16 secured at its upper end some distance above the board 6.

In operation, the sled will be drawn or will move down an incline by gravity in the usual manner. If it is desired to make a turn with the sled, the wheel 16 will be turned and, through the crank disk 14 and links 15, the bars 11 will be moved to swing the runners 9 about the axis of the side rod 8. If the turn is to be made toward the left the runners will be turned, as shown in Fig. 3. The flat bottom side of the runner is turned at an angle and the sharp corner of the runner is brought into engagement with the surface of the snow or ice and will bite into the surface so that the sled is turned and side slipping and skidding of the sled prevented. If the supporting surface is slightly soft the flat bottom of the runner will push against the same increasing the lateral resistance and causing the turning movement. The bringing of the sharp corner of the runner into engagement with the surface also increases the lateral resistance which causes the sled to turn, the same way that a skate is turned when the skater makes a turn on the ice, or in the same manner that a skier turns his skis. The sled naturally turns away from the side encountering said lateral resistance. Side slipping or skidding of the sled and consequent overturning, is avoided and a firm lateral thrust or bearing against the supporting surface is obtained. If the turn is to be made in the other direction, the runners will, of course, be turned in the opposite direction.

From the above description it is seen that applicant has provided a simple and efficient sled structure for effectively turning the sled and preventing skidding on curves, thus greatly facilitating the control of the sled in turning curves. The device has been amply demonstrated in actual practice and found to be very successful and efficient.

It will, of course, be understood, that various changes may be made in the form, details, arrangement and proportions of the parts without departing from the scope of applicant's invention, which, generally stated, consists in a device capable of carrying out the objects above set forth, in the novel parts and combinations of parts disclosed and defined in the appended claims.

What is claimed is:

1. A sled having in combination, a frame comprising a seat, lugs rigid with respect to said seat and disposed close thereto at each side of and beneath the same, arms pivoted at their upper ends to said lugs about axes located close to said seat and normally extending vertically downward a considerable distance from said lugs and axes, a pair of runners rigidly secured to the lower ends of said arms and disposed respectively at each side of said frame, said runners being of angle shape in cross section, with the angle directed outwardly, means connected to said arms between said runners and lugs for swinging said arms laterally about their pivots and operating means for said last mentioned means.

2. A sled having in combination, a frame comprising a seat, lugs rigid with respect to said seat and extending downward a short distance at each side thereof, arms pivoted at their upper ends to said lugs and normally extending vertically downward therefrom, a pair of runners rigidly secured to the lower ends of said arms and disposed respectively at each side of said frame, said runners being of angle shape in cross section, with the angle directed outwardly, a crank disk mounted below said frame, means connected to said disk and to said arms between said runners and lugs, a stem connected to said disk and extending above said frame and seat, and an operating member connected to the upper end of said stem to turn the same and swing said arms and runners about the pivots of said arms.

3. A sled having in combination, a seat, spaced rods extending longitudinally therebeneath, spaced runners mounted on said rods for lateral swinging movement, a rotatable vertical stem extending through said seat, a crank disc at the lower end thereof, means connected to said crank disc and said runners for simultaneously turning them in the same direction about said rods, and means secured to said stem above said seat for turning said stem and disc.

In testimony whereof I affix my signature.

JOHN PEDERSON.